(12) United States Patent
Gendrin et al.

(10) Patent No.: US 6,511,136 B1
(45) Date of Patent: Jan. 28, 2003

(54) PNEUMATIC SERVOBRAKE

(75) Inventors: Stéphane Gendrin, Bruz (FR); Jean Fourcade, Les Lilas (FR); Fernando Sacristan, Barcelona (ES); Jean-Marc Piel, Drancy (FR)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 10/009,391

(22) PCT Filed: Jul. 12, 2001

(86) PCT No.: PCT/FR01/02254
§ 371 (c)(1),
(2), (4) Date: Nov. 26, 2001

(87) PCT Pub. No.: WO02/08037
PCT Pub. Date: Jan. 31, 2002

(30) Foreign Application Priority Data

Jul. 25, 2000 (FR) ............................................ 00 09754

(51) Int. Cl.⁷ ................................................. B60T 8/34
(52) U.S. Cl. .................................. 303/118.1; 303/114.3
(58) Field of Search .............................. 303/118.1, 125, 303/114.3, 113.4, 115.4, 155; 91/369.1, 376 R, 533; 92/48, 49

(56) References Cited

U.S. PATENT DOCUMENTS 4,756,231 A  *  7/1988  Kobayashi et al. ........ 91/369.2
5,526,729 A  *  6/1996  Ando et al. .................... 91/32
5,725,291 A  *  3/1998  Michels ...................... 303/125
6,253,656 B1 *  7/2001  Gilles ........................... 91/367

FOREIGN PATENT DOCUMENTS

DE          0706924 A  *  4/1996
DE       19729158 C  *  10/1998

* cited by examiner

Primary Examiner—Pam Rodriguez
(74) Attorney, Agent, or Firm—Leo H. McCormick, Jr.; Warren Comstock

(57) ABSTRACT

A pneumatic servobrake having a detector (13) for the measurement of the pressure in a front chamber (1). The detector (13) has a baseplate (14) that is situated opposite an opening (25) in a wall (26) of the front chamber (1). A yoke-forming cage (38) that is placed over the opening (25) has an opening (40) that is traversed by a pressure sampling tube (16). The tube has a collar (41) that is retained between the cage (38) and the baseplate (14). An adapter (23) connected to the wall (26) urges the tube (16) against the cage (38) to allow for both a sideways motion (20) and a tilting motion (21). The lower part (31) of the tube (16) is fitted with an O ring (33) to establish a sealed pneumatic connection between the tube (16) and baseplate (14) such that a first sensor (15) is isolated from a second sensor (48) in a measurement of pressure in the first chamber (1).

10 Claims, 1 Drawing Sheet

U.S. Patent  Jan. 28, 2003  US 6,511,136 B1
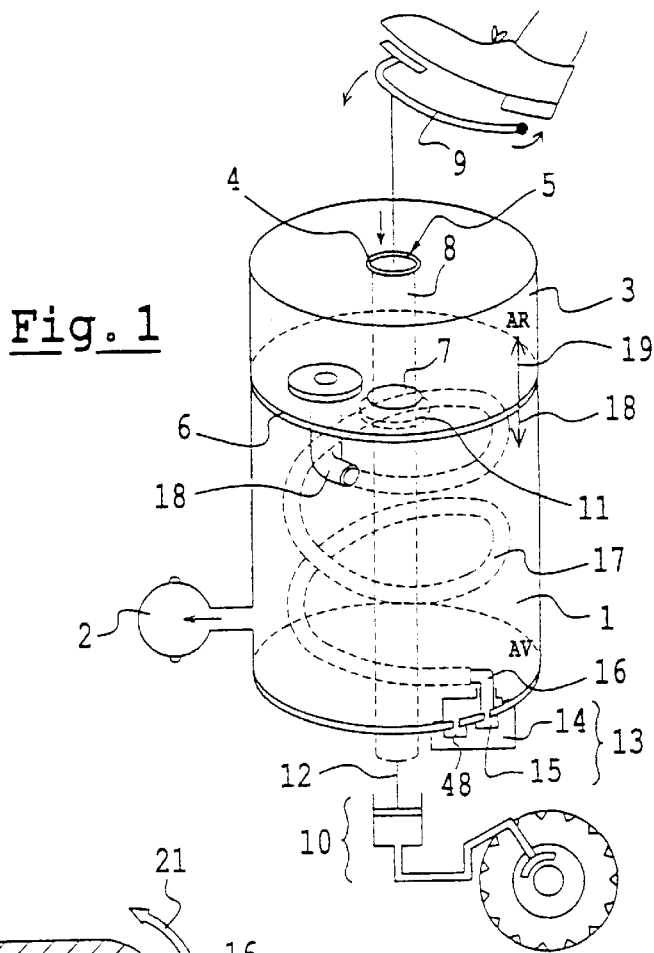
Fig. 1
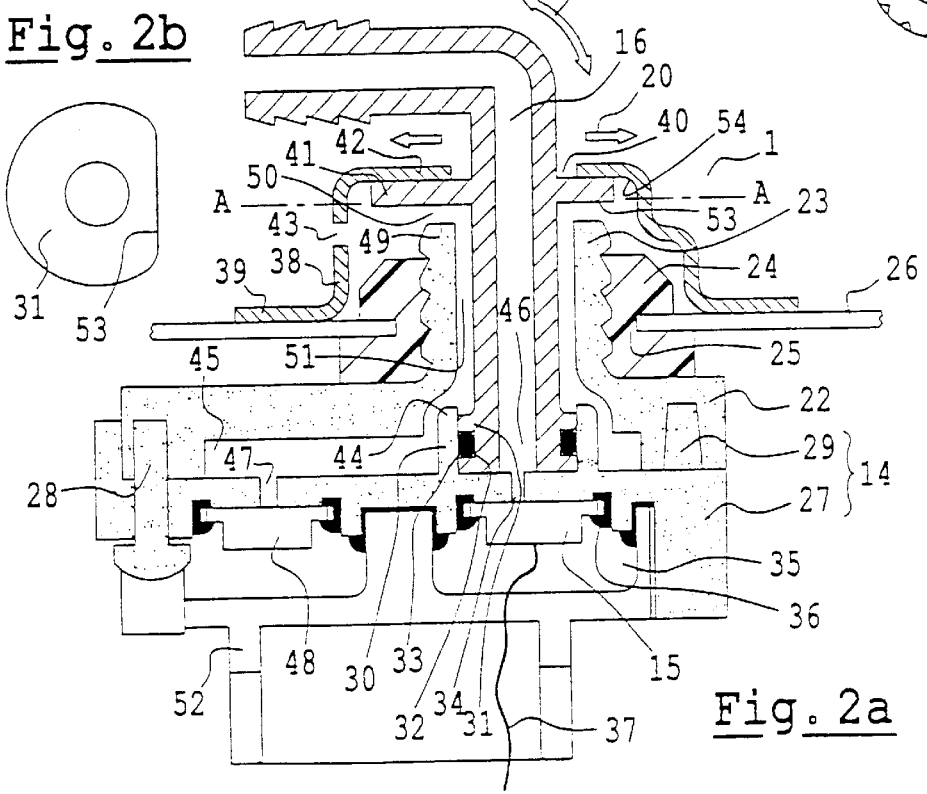
Fig. 2b
Fig. 2a

PNEUMATIC SERVOBRAKE

This invention relates to a pneumatic servobrake and to its assembling process. The object of the invention consists in simplifying the manufacture of such servobrakes for a better cost control and, in the first place, for a more reliable structure.

BACKGROUND OF THE INVENTION

Fundamentally, a pneumatic servobrake comprises a variable-volume front chamber, separated from a variable-volume rear chamber by a partition wall, consisting of a tight flexible diaphragm, and by a rigid skirt-forming plate. The rigid skirt drives a pneumatic piston which bears, through a push rod, on the primary piston of a master cylinder of a hydraulic braking system, typically a tandem master cylinder. The front chamber, directed towards the master cylinder, is pneumatically connected to a vacuum source whereas the rear chamber, in the opposite direction to the front chamber and on the side of a brake pedal, is pneumatically connected, under a valve control, to a propellant fluid source, typically atmospheric-pressure air. At rest, that is when the driver does not depress the brake pedal, the front and rear chambers are interconnected, while the rear chamber is isolated from the atmospheric pressure. On braking, first the front chamber is isolated from the rear chamber and then air is admitted into the rear chamber. Such air entrance imparts a propulsive motion to the partition wall, thus actuating the pneumatic braking assistance.

Besides, hydraulic brake assisting systems are known, in which an electric motor is conventionally connected to a hydraulic pump, injecting a pressure fluid into the brake circuit when it is actuated. The electric motor is controlled on the basis of the measurement of the pressures within the front and rear chambers of the pneumatic servobrake. Therefore, two pressure sensors are pneumatically connected to each chamber, so as to measure the fluid pressure in it. These sensors output electrical signals, indicative of the pressures. For convenience sake, the pressure sensors are installed on an outer wall of the front chamber, close to the master cylinder. As regards the measurement of the pressure in the front chamber, one only has to make a hole in the front chamber and place a pressure sensor opposite such hole. As for the measurement of the pressure in the rear chamber, the choice taken consists in drilling the partition wall between the chambers and in installing, in the opening thus made, a tight tube, extending within the front chamber and opening into a second hole, made in the latter. A second pressure sensor is set opposite this second hole. The tube is a flexible one and, furthermore, it enables the partition wall to move inside both chambers. Owing to the fact that the partition wall can take forward and backward positions, with a great range in the first chamber, the tube is manufactured in the shape of an unfolding spiral. The spiral pitch can be reduced or widened, depending on whether the partition wall is in a forward or a backward position in the chambers.

Because of the cost and, more particularly, on account of a material saving, the thicknesses of the chamber walls have to be reduced. Well then, it becomes evident that, owing to the motions of the partition wall and of the flexible tube, a pressure sampler head, for the pressure in the rear chamber, often in the shape of an elbow pipe, is subjected to stresses tending to break it or at least to separate it from the wall of the front chamber, to which it is fastened. More particularly, the tube exerts, on this head, bending and tilting forces which result in a possible loss of tightness at the attachment of said head to the wall of the front chamber.

Besides, the fact that there are two sensors gives rise to a second problem. The cost of such an implementation, i.e. the manufacturing cost plus the installation cost, heavily penalizes this solution from the economic point of view.

SUMMARY OF THE INVENTION

It is therefore an object of this invention to cope with the above-mentioned problems and to provide a pressure sampler head, which is designed so as to reduce, to an appreciable extent, the hyperstatic properties of the attachment, which constitutes a barrier without any tolerances to the forces exerted by the flexible tube during the travel of the partition wall. Thus in the invention, the tightness function and the mechanical holding function are separated as regards the pressure sampler head, by means of a detector baseplate rigidly mounted on the wall of the front chamber. The pressure sampler head comprises a sample tube which is maintained, in a fluidproof manner, at its lower part on the baseplate. Besides, this lower part is mechanically kept in contact with the baseplate through a collar bearing on the shoulder-forming edge of an opening made in a yoke-forming cage. In such a way, the tube may be slightly moved in the opening, both sideways and in the depth direction. That is to say that, though the sample tube should not be considered to be mobile, it is capable of slight motions and, this being so, whatever its position may be during such motions, the tightness of the connection is kept.

Of course, this solution will be preferred for the implementation of a double detector. As a matter of fact, the cage is perforated, either at its side wall or at its base, so as to communicate with the inside of the front chamber. Preferably, one hole only is made in said front chamber and the sample tube passes through this hole, with a sufficient clearance to define two spaces at the hole: one, inside the sample tube (connected besides by the flexible tube to the rear chamber), one free space about the ample tube and connected to the front chamber via a hole in the cage. Both passages are preferably concentric.

It results in that the sample tube is mechanically retained, that it can tolerate some stresses thanks to slight motions, and in that it ensures the tightness, by means of a seal which is always fluidproof, whatever the position of the tube may be in the course of its motions.

Therefore, it is an object of the present invention to provide a pneumatic servobrake, comprising a front chamber, capable of being connected to a vacuum source, a rear chamber, which can be connected to a high pressure supply inlet, a moving tight partition wall between said chambers, a moving set carried along by the partition wall and connected to a hydraulic braking circuit, a device provided for the supply of the rear chamber with a high-pressure fluid at the time of a braking operation, an opening in a wall of the front chamber, and a detector opposite such opening for the measurement of the pressure in at least one of the chambers, characterised in that said detector comprises a baseplate and a sample tube, the baseplate being connected, by means of a single rigid link, to the wall of the front chamber, whereas the sample tube is fastened, in a fluidproof manner, by its lower part to the baseplate, such tube comprising a collar, and a yoke-forming cage being fastened to the wall of the front chamber, the collar resting on a shoulder-forming edge of an opening made in the cage.

This invention also deals with an assembling process for a pneumatic servobrake, wherein:

a front chamber is provided, which is capable of being connected to a vacuum source;

a sample tube is inserted through an opening made in a yoke-shaped cage, a collar of the sample tube resting on a shoulder-forming edge of the opening;

the cage is fastened to an inner wall of the front chamber, opposite a hole in the front chamber, said wall having such hole opposite said opening;

a joint for the front chamber is inserted into the hole, so as to fit around the sample tube, and then an adapter of a baseplate of a one-piece detector, intended for the measurement of pressures, is inserted into said joint.

Other features and advantages of the present invention will be apparent from the following detailed description, by way of example and by no means as a limitation, when taken in conjunction with the accompanying drawings.

BRIEF DESCRIPTION OF THE DRAWINGS

FIG. 1 is a schematic illustration of a pneumatic servobrake implementing the present invention; and FIGS. 2a and 2b are sectional views showing, respectively, a one-piece detector and a collar of a sample tube of such detector, along the line A—A of FIG. 2a.

DETAILED DESCRIPTION OF THE INVENTION

FIG. 1 shows a pneumatic servobrake according to this invention, which comprises a front chamber 1, connectable to a vacuum source 2, e.g. a negative-pressure pump. In a typical manner, the pump 2 may consist of an offtake of the intake gas in a vehicle engine. In the case of a Diesel engine, a vacuum pump will be used. The servobrake also comprises a rear chamber 3, which can be connected, through a valve 4, schematically represented here, to a high-pressure supply inlet 5, conventionally ambient air. Besides the servobrake comprises a moving partition wall 6, usually fitted with a rigid skirt and a tight diaphragm. This diaphragm prevents a pneumatic communication between the chambers. A fluidproof opening 7 is pierced through the partition wall 6 so as to let a moving set 8 through. The set 8 is mechanically connected, on the one hand, to a brake pedal 9 and, on the other hand, to a hydraulic braking circuit 10. The assistance principle of such a servobrake is as follows. When the brake pedal 9 is depressed, the moving set 8 plunges into the rear chamber, thus exposing the valve 4, through which ambient air flows into the rear chamber 3. At this time, the ambient air presses on the partition wall 6 which drives, through a support 11 integral with the moving set 8, the moving set 8 in such a way that an end 12 of the latter actuates the hydraulic braking circuit 10.

The servobrake comprises a detector 13 for the measurement of the pressures in at least one of the chambers and, preferably, in both chambers. The detector 13 comprises a baseplate 14, supporting a first sensor 15 opposite a sample tube 16. In a preferred embodiment, the sample tube 16 is connected, in a fluidproof manner, to the rear chamber 3 by means of a helical flexible hose 17, which opens into the rear chamber 3 through an elbow pipe 18. Yet the sample tube 16 could be only a tube for the sampling of the fluid pressure inside the front chamber 1.

FIG. 2a is a more detailed view of the one-piece detector 13. More particularly, it shows how the embodiment according to the invention solves a problem as regards the mechanical resistance to the forces exerted by the flexible hose 17 when the partition wall 6 is travelling, depending on the various uses, within the chambers 1 and 3, in the direction of the arrows 20 and 21. The present device is capable of providing the servobrake with an improved strength, with no risk of fatigue in the course of time so that, in this connection, the servobrake may be fit for use for ten years or so. Owing to the forces exerted by the hose 17, the tube 16 is subjected to sideways stresses 20 or to tilting stresses 21. In a preferred manner, the elbow-shaped tube 16 is made of a plastic, e.g. polyvinyl chloride (PVC) or acrylonitrile-butadiene-styrene (ABS).

For a leakproof pneumatic connection, the baseplate 14 supports the sample tube 16 with some free play, corresponding to the motions in the directions of the arrows 20 and 21. For this purpose, the baseplate 14 comprises a stand 22 provided with an adapter 23, which is fitted through a tight joint 24 into an opening 25 made in a wall 26 of the front chamber 1. The joint 24 is smooth so as to achieve an almost rigid and leakproof attachment. On the other hand, its shape is adapted to that of the fir branch shaped notches in the adapter 23. Besides, the joint 24 rests on the edge of the opening 25 in the wall 26, by means of lips which are applied against the wall 26.

The baseplate 14 also comprises a cover 27, fastened to the stand 22. The cover 27 is rigidly attached to the stand 22, by example through rivets or screws 28 and 29. Besides, the cover 27 has a round tower 30, extending upwards perpendicular to the cover 27, towards the adapter 23. In the preferred embodiment, the inner diameter of the tower is equal to the inner diameter of the hollow adapter 23, itself equal to the maximum outer diameter of the sample tube 16. This maximum outer diameter of the sample tube 16 is, for instance, the diameter at the lower part 31 of the sample tube 16. In particular, the lower part 31 has a circular groove 32, an outer groove here, in which a O ring 33 is fitted. In the present embodiment, the tower is situated on the outside of the tube 16. However, the tower might also be located inside the tube 16. Since the O ring 33 bears, on the one hand, on the inner wall of the tower 30 and, on the other hand, on the roof of the groove 32 made in the sample tube 16, there is an actual pneumatic tightness of the connection between the sample tube 16 and the cover 27 and thus with the baseplate 14. Since the tight connection is at the lower part of the sample tube 16, it can withstand tilting forces. For this purpose, that part of the tube 16, which has a greater diameter than the rest of the tube, has a limited height. Besides, the height of the tower 30 permits a slight vertical sliding motion. Moreover, it would be possible to replace the O ring 33 by a tight glue joint, e.g. silicone, or a rubber seal.

A hole 34 is made in the cover 27, opposite the sample tube 16 and it opens into a receptacle 35 in which the pressure sensor 15 is disposed. Such sensor 15 is, for instance, retained within the receptacle 35 through a tight joint 36, situated at its periphery and in contact with the cover 27. This joint 36 is a stationary one. The sensor 15 outputs a usable signal, transmitted by an electrical signal line 37 for the control of the hydraulic circuit 10.

Thus, the lower part of the sample tube 16 rests on the edge of the hole 34 and in contact with the cover 27 of the baseplate 14. Besides, a cage 38 is fastened to the wall 26. By example, the sheet-metal cage 38 can be spot welded to the wall 26, consisting of a sheet metal as well. The cage 38 is rigidly fastened to the wall 26, and the cage 38 has the general shape of a basin, the brims 39 of which bear on the wall 26. The cage 38 has an opening 40 traversed by the sample tube 16. At the opening 40, the tube 16 exhibits a collar 41 resting on a shoulder-forming edge 42 of the cage 38. This being so, the tube 16 is retained along its principal axis, on the one hand, by the collar 41 resting on the shoulder-forming edge 42 and, on the other hand, by its lower part, which bears on the edges of the hole 34. And the cage 38 acts like a yoke. The opening 40 is larger than the outer diameter of the sample tube 16, so as to allow for some clearance as a function of the direction of the forces 20 and 21. Therefore, thanks to the design, when the partition wall 6 travels upward or downward inside the chambers 1 and 3, the flexible hose 17 exerts, on the sample tube 16, forces which do not tend either to break it or to impair the tightness of the pneumatic connection 33.

It has been pointed out in the foregoing that, in a preferred manner, the detector is a double one permitting, in a monobloc design, the measurement of the pressures in both chambers, using a single opening 25 in the wall 26. To this end, the yoke-forming cage 38 has a port 43, through which the pressure inside the front chamber 1 may also be present in the cage 38. At the periphery of the sample tube 16, in the adapter 23, there is the same pressure as in the vacuum chamber 1. The tower 30 is designed in such a way that its top 44 does not come into contact with the stand 22 and, therefore, a chamber 45, provided in the baseplate 14, may communicate with the front chamber 1. Thus the chamber 45 is isolated from a chamber 46, provided at the lower part of the tube 16. Chamber 45 is situated opposite another hole 47, made in the cover 27. A second sensor 48, of the same type as the sensor 15, faces the hole 47. Under the circumstances, the sensor 48 measures the pressure inside the vacuum chamber 1. Therefore, with a single one-piece detector 14 and a single opening 25, both pressures can be measured. Besides, the manufacturing and the installation of a single one-piece detector are more convenient and less costly than the use of two separate detectors, and it results in a more reliable servobrake.

The mounting principle for such a device is the following. In the first place, the sample tube 16 is fitted within the cage 38, so that it passes through the opening 40 made in the latter, and its collar 41 rests on it. Then the cage 38 is fastened, with the swinging tube 16 inside, to the wall 26. Before or after such fastening, the joint 24 is placed into the opening 25 and the stand 22 is fitted into it. Such solution is possible because the outer diameter of the lower part of the tube 16 is at most equal to the inner diameter of the adapter 23 of the stand 22. The size of the adapter 23 is calculated in such a way that its end 49 does not come into abutment against the collar 41 but, instead, that some clearance 50 may be provided for the motions 20 and 21 and, besides, for the fluid flow from the chamber 1 into the concentric peripheral space 51 about the tube 16. Then, the cover 27 is placed on the stand 22, without forgetting to fit the O ring 33 on the tube 16. As a variant, the O ring might be fitted in a groove, provided in the tower 30. The cover 27 can be equipped with the sensors 15 and 48 before it is installed on the stand 22. Besides, the receptacles, provided in the cover 27 for the sensors 15 and 48, can be blinded by a protective plate 52.

Preferably, as shown in FIG. 2b, the collar 41 has a contoured shape, for instance with a plain flat 53. Such flat 53 is intended for an embedding, at least approximately, into a margin-forming recess 54 in the cage 38. As a matter of fact, had the collar been round, then the elbow-shaped tube 16 would have been able to turn on itself by a full revolution. So as not to subject the joint 33 to an excessive friction wear, its rotational motions are restricted to those which are strictly required owing to the flexibility of the hose 17. In actual fact, the flat 53 does not entirely bear on the margin 54, so that the elbow-shaped tube 16 may turn on itself on a few degrees.

What is claimed is:

1. A pneumatic servobrake having a front chamber (1) connected to a vacuum source (2), a rear chamber (3) connected to a high-pressure supply inlet (5), a moving tight partition wall (6) located between said front and rear chambers, a moving member (8) carried along by said partition wall (6) and connected to a hydraulic braking circuit (10), a valve (4) for providing high-pressure fluid to said rear chamber (3) to initiate a braking operation, an opening (25) in a wall (26) of said front chamber (1) and a detector (15) located adjacent said opening (25) for measuring a pressure in at least one of said front (1) and rear (3) chambers, characterised in that said detector (15) comprises a baseplate (14) and a sample tube (16), said baseplate (14) being connected by means of a single rigid link to said wall (26) of the front chamber (1), said sample tube (16) having a lower part (31) fastened to said baseplate (14) in a sealing manner (33), said tube (16) being fastened to said wall (26) of said front chamber (1) by a collar (41) connected to a yoke-forming cage (38) by said collar (41) resting on a shoulder-forming edge (42) of an opening (40) in said cage (38).

2. The servobrake according to claim 1, characterised in that said collar (41) has a contoured shape (53) which provides for a directional bearing on a recess-forming margin (54) of said opening (40).

3. The servobrake according to claim 1, characterised in that said sealing manner of said said sample tube (16) with said baseplate (14) is achieved by the engagement of a O ring (33) being located in a circular groove (32) and the engagement with a circular cylindrical wall (30) on said baseplate (14).

4. The servobrake according to claim 1, characterised in that said cage (38) includes a port (43) in communication with said front chamber (1).

5. The servobrake according to claim 1, wherein said detector (15) is characterized by a first sensor (15) and a second sensor (48) and wherein said baseplate (14) has a first chamber (45) and a second chamber (46), said first sensor (15) being connected by a passage (34) to said second chamber (46) and the inside of said sample tube (16) while said second sensor (48) is connected by a passage (47) to said first chamber (45) and a space (51) located on the outside of the sample tube (16).

6. The servobrake according to claim 5, characterised in that a portion of said space (51) is concentric with said sample tube (16).

7. The servobrake according to claim 1, characterised in that said sample tube (16) comprises an elbow pipe connected to a helical flexible hose (17).

8. The servobrake according to claim 1, characterised in that said baseplate (14) is connected to said wall (26) by means of a leakproof joint (24) intended for a fir-branch type connection.

9. An assembling process for a pneumatic servobrake, wherein:

a front chamber (1) defined in a housing is designed to be connected to a vacuum source (2);

a sample tube (16) is inserted through an opening (40) in a yoke-shaped cage (38) with a collar (41) of said sample tube (16) resting on a shoulder-forming edge (42) of said opening (40);

locating said cage (38) opposite a hole (25) in a wall (26) of the front chamber (1);

inserting a joint (24) into said hole (25) to fit around said sample tube (16), and thereafter inserting an adapter (23) for a baseplate (22) of a one piece detector (14) intended for the measurement of pressures is connected to said joint (24) bringing said collar (41) into sealing engagement with said shoulder forming edge (42).

10. The process according to claim 9, characterised in that said sample tube (16) is connected to a cover (27) of said baseplate through a tight O ring (33).

* * * * *